(12) United States Patent
Hong et al.

(10) Patent No.: US 9,035,847 B2
(45) Date of Patent: May 19, 2015

(54) ANTENNA PATTERN FRAME AND MOLD FOR MANUFACTURING ELECTRONIC DEVICE CASE INCLUDING THE SAME

(75) Inventors: Ha Ryong Hong, Gyunggi-do (KR); Sung Eun Cho, Gyunggi-do (KR); Dae Kyu Lee, Gyunggi-do (KR); Chan Gwang An, Gyunggi-do (KR); Jae Suk Sung, Gyunggi-do (KR); Ki Won Chang, Gyunggi-do (KR); Dae Ki Lim, Gyunggi-do (KR); Chang Mok Han, Chungcheongnam-do (KR); Hyun Do Park, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 462 days.

(21) Appl. No.: 13/027,345

(22) Filed: Feb. 15, 2011

(65) Prior Publication Data
US 2011/0205141 A1 Aug. 25, 2011

(30) Foreign Application Priority Data

Feb. 25, 2010 (KR) .......................... 10-2010-0017247

(51) Int. Cl.
*H01Q 1/40* (2006.01)
*H01Q 1/24* (2006.01)
(Continued)

(52) U.S. Cl.
CPC ........... *B29C 45/1671* (2013.01); *B29C 45/006* (2013.01); *B29C 45/14065* (2013.01); *B29C 45/14639* (2013.01);
(Continued)

(58) Field of Classification Search
CPC ............................ B29C 45/14065; H01Q 1/38
USPC ................................... 343/702, 873; 425/116
See application file for complete search history.

(56) References Cited

U.S. PATENT DOCUMENTS

| 4,427,615 A | 1/1984 | Eskesen |
| 6,396,444 B1 | 5/2002 | Goward et al. |

(Continued)

FOREIGN PATENT DOCUMENTS

| CN | 1363967 | 8/2002 |
| EP | 0500219 A1 | 8/1992 |

(Continued)

OTHER PUBLICATIONS

European Search Report in 11250206.7 issued on Jul. 8, 2011.
(Continued)

*Primary Examiner* — Dameon E Levi
*Assistant Examiner* — Ricardo Magallanes
(74) *Attorney, Agent, or Firm* — McDermott Will & Emery LLP

(57) ABSTRACT

There is provided an antenna pattern frame including: a radiator comprising an antenna pattern portion transmitting and receiving a signal and a connection terminal portion allowing the signal to be transmitted to and received from a circuit board of an electronic device; and a radiator frame manufactured by injection molding on the radiator, allowing the antenna pattern portion to be embedded in a case of the electronic device, and supporting the radiator. The radiator frame includes a hydraulic recess introducing a resin material to a mold for manufacturing a case of the electronic device in which the radiator is embedded through injection molding, so that the radiator frame contacts the mold by injection pressure.

6 Claims, 9 Drawing Sheets

(51) Int. Cl.
   *B29C 45/16* (2006.01)
   *B29C 45/14* (2006.01)
   *H01Q 9/04* (2006.01)
   *B29C 45/00* (2006.01)
   *B29L 31/34* (2006.01)

(52) U.S. Cl.
   CPC .............. *B29C 2045/14147* (2013.01); *B29L 2031/3431* (2013.01); *B29L 2031/3437* (2013.01); *B29L 2031/3456* (2013.01); *B29L 2031/3481* (2013.01); *H01Q 1/243* (2013.01); *H01Q 1/40* (2013.01); *H01Q 9/0421* (2013.01)

(56) References Cited

U.S. PATENT DOCUMENTS

| | | | |
|---|---|---|---|
| 7,605,765 B2* | 10/2009 | Ku | 343/702 |
| 2002/0080077 A1 | 6/2002 | Kamei et al. | |
| 2003/0030593 A1* | 2/2003 | Tomomatsu et al. | 343/895 |
| 2005/0024274 A1* | 2/2005 | Byun et al. | 343/702 |
| 2006/0220957 A1* | 10/2006 | Tanaka et al. | 343/700 R |
| 2007/0040755 A1* | 2/2007 | Na et al. | 343/702 |
| 2008/0055258 A1 | 3/2008 | Sauers | |
| 2008/0138554 A1 | 6/2008 | Maeda et al. | |
| 2009/0015507 A1* | 1/2009 | Hong et al. | 343/873 |
| 2010/0271265 A1 | 10/2010 | Sung et al. | |
| 2010/0271270 A1 | 10/2010 | Sung et al. | |
| 2010/0271272 A1 | 10/2010 | Sung et al. | |

FOREIGN PATENT DOCUMENTS

| | | | | |
|---|---|---|---|---|
| EP | 2284947 A1 | 2/2011 | | |
| EP | 2302733 A2 | 3/2011 | | |
| JP | 2003-260724 A | 9/2003 | | |
| KR | 1020070109332 | * 11/2007 | | H01Q 1/27 |
| KR | 1020090035635 | 4/2009 | | |
| KR | 100910161 | * 7/2009 | | H01Q 1/24 |
| KR | 100932079 B1 | 12/2009 | | |

OTHER PUBLICATIONS

Office Action mailed May 28, 2013 corresponding to Chinese patent application No. 201110049814.0.

* cited by examiner

US 9,035,847 B2

ANTENNA PATTERN FRAME AND MOLD FOR MANUFACTURING ELECTRONIC DEVICE CASE INCLUDING THE SAME

CROSS-REFERENCE TO RELATED APPLICATIONS

This application claims the priority of Korean Patent Application No. 10-2010-0017247 filed on Feb. 25, 2010, in the Korean Intellectual Property Office, the disclosure of which is incorporated herein by reference.

BACKGROUND OF THE INVENTION

1. Field of the Invention

The present invention relates to an antenna pattern frame and a mold for manufacturing an electronic device case including the same, and more particularly, to an antenna pattern frame having a radiator on a surface thereof such that an antenna radiator is embedded in an electronic device case, and a mold for manufacturing an electronic device case including the same.

2. Description of the Related Art

Mobile communications terminals such as cellular phones, personal digital assistants (PDAs) and laptop computers, which support wireless communications, are indispensable devices in modern society. Functions including CDMA, wireless LANs, GSM and DMB have been added to these mobile communications terminals. One of the most important components that enable these functions is associated with antennas.

Antennas being used in these mobile communications terminals have advanced from external antennas, such as rod antennas or helical antennas, to internal antennas that are disposed inside terminals.

External antennas are susceptible to damage by external shock, while internal antennas increase the volume of terminals.

In order to solve these problems, research has been undertaken to manufacture antennas that are formed integrally with mobile communications terminals.

SUMMARY OF THE INVENTION

An aspect of the present invention provides an antenna pattern frame and a mold for manufacturing an electronic device case including the same, capable of stably fixing an antenna pattern frame to the mold for manufacturing an electronic device case so as to prevent the protrusion thereof to the exterior, and protecting an antenna connection terminal from injection liquid.

According to an aspect of the present invention, there is provided an antenna pattern frame including: a radiator including an antenna pattern portion transmitting and receiving a signal and a connection terminal portion allowing the signal to be transmitted to and received from a circuit board of an electronic device; and a radiator frame manufactured by injection molding on the radiator, allowing the antenna pattern portion to be embedded in a case of the electronic device, and supporting the radiator. The radiator frame includes a hydraulic recess introducing a resin material to a mold for manufacturing a case of the electronic device in which the radiator is embedded through injection molding, so that the radiator frame contacts the mold by injection pressure.

The radiator may include a connection portion forming a part of the radiator and connecting the connection terminal portion with the antenna pattern portion so that the antenna pattern portion is disposed on one side of the radiator frame and the connection terminal portion is disposed on the other side thereof, which is opposite to the one side.

The connection terminal portion may be supported by a radiator support portion protruding from the other side of the radiator frame, which is opposite to the one side thereof on which the antenna pattern portion is disposed.

The hydraulic recess may be formed in the radiator support portion.

According to another aspect of the present invention, there is provided an antenna pattern frame including: a radiator including an antenna pattern portion transmitting and receiving a signal and a connection terminal portion allowing the signal to be transmitted to and received from a circuit board of an electronic device; and a radiator frame manufactured by injection molding on the radiator, allowing the antenna pattern portion to be embedded in a case of the electronic device, and supporting the radiator. The radiator frame includes a support hole in which a support boss, formed in a mold for manufacturing a case of the electronic device in which the radiator is embedded through injection molding, is inserted so that the radiator frame contacts the mold.

The radiator may include a connection portion forming a part of the radiator and connecting the connection terminal portion with the antenna pattern portion so that the antenna pattern portion is disposed on one side of the radiator frame and the connection terminal portion is disposed on the other side thereof, which is opposite to the one side.

The connection terminal portion may be supported by a radiator support portion protruding from the other side of the radiator frame, which is opposite to the one side thereof on which the antenna pattern portion is disposed.

The support hole may be formed in the radiator support portion.

According to another aspect of the present invention, there is provided a mold for manufacturing an electronic device case, the mold including: upper and lower molds receiving an antenna pattern frame including an antenna pattern portion transmitting and receiving a signal, a connection terminal portion allowing the signal to be transmitted to and received from a circuit board of an electronic device, and a radiator frame supporting the radiator; and a resin material injection portion provided through the upper mold, the lower mold, or the upper and lower molds, the resin material injection portion through which a resin material is injected into an internal space, created between the upper and lower molds when the upper and lower molds are joined, so that the antenna pattern portion of the radiator frame is embedded in a case of the electronic device. The radiator frame includes a hydraulic recess introducing a resin material into the internal space for the injection molding of the case of the electronic device, so that the radiator frame contacts the mold by injection pressure, and the electronic device case in which the radiator frame is embedded is injection-molded by the internal space.

The connection terminal portion may contact a radiator support portion protruding from an opposite side to a side on which the antenna pattern portion of the radiator frame is formed, and the lower mold may include an insertion recess receiving the radiator support portion.

The insertion recess may be greater than the radiator support portion.

The lower mold may contact one side of the antenna pattern frame, and the upper mold may create a space with the other side of the antenna pattern frame, so that a resin material is introduced into the space.

The internal space may be provided with a curve forming portion so that the electronic device case has a curved portion.

According to another aspect of the present invention, there is provided a mold for manufacturing an electronic device case, the mold including: upper and lower molds receiving an antenna pattern frame including an antenna pattern portion transmitting and receiving a signal, a connection terminal portion allowing the signal to be transmitted to and received from a circuit board of an electronic device, and a radiator frame supporting the radiator; and a resin material injection portion provided through the upper mold, the lower mold, or the upper and lower molds, the resin material injection portion through which a resin material is injected into an internal space, created between the upper and lower molds when the upper and lower molds are joined, so that the antenna pattern portion of the radiator frame is embedded in a case of the electronic device. The upper mold, the lower mold or the upper and lower molds include a support boss fixing and supporting the radiator frame to the internal space; and the radiator frame includes a support hole in which the support boss is inserted so that the radiator frame contacts the mold, and the electronic device case in which the radiator frame is embedded is injection-molded by the internal space.

The connection terminal portion may contact a radiator support portion protruding from an opposite side to a side on which the antenna pattern portion of the radiator frame is formed, and the lower mold may include an insertion recess receiving the radiator support portion.

The insertion recess may be greater than the radiator support portion.

The support boss may be formed in the insertion recess.

The support boss may contact the upper mold.

The lower mold may contact one side of the antenna pattern frame, and the upper mold may create a space with the other side of the antenna pattern frame so that a resin material is introduced into the space.

The internal space may have a curve forming portion so that the electronic device case has a curved portion

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
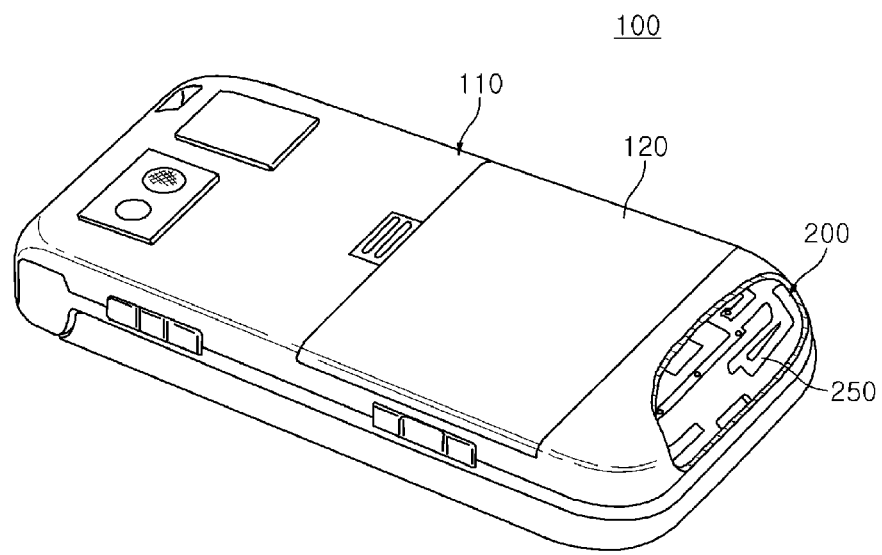
FIG. 1 is a schematic perspective view, with a cut-away portion, of a case of a mobile communications terminal, which is an electronic device, according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

The same or equivalent elements are referred to by the same reference numerals throughout the specification.

Figure 2:
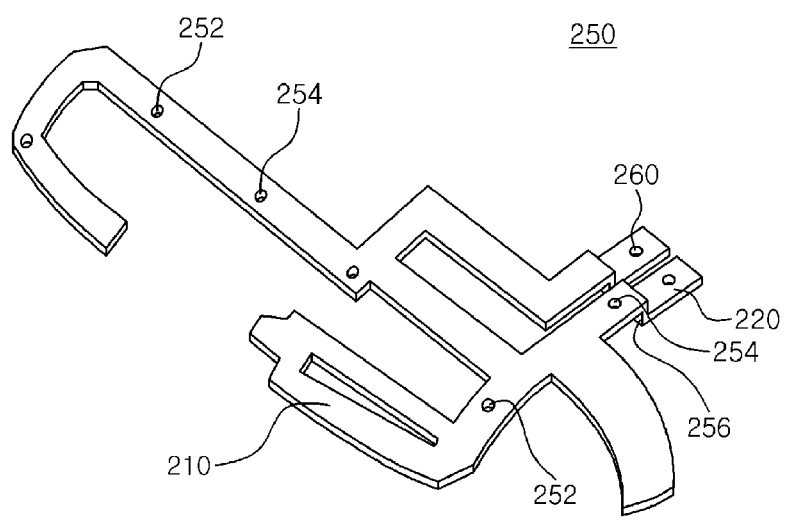
FIG. 2 is a schematic perspective view illustrating a radiator used in manufacturing an antenna pattern frame according to an exemplary embodiment of the present invention.
Figure 3:
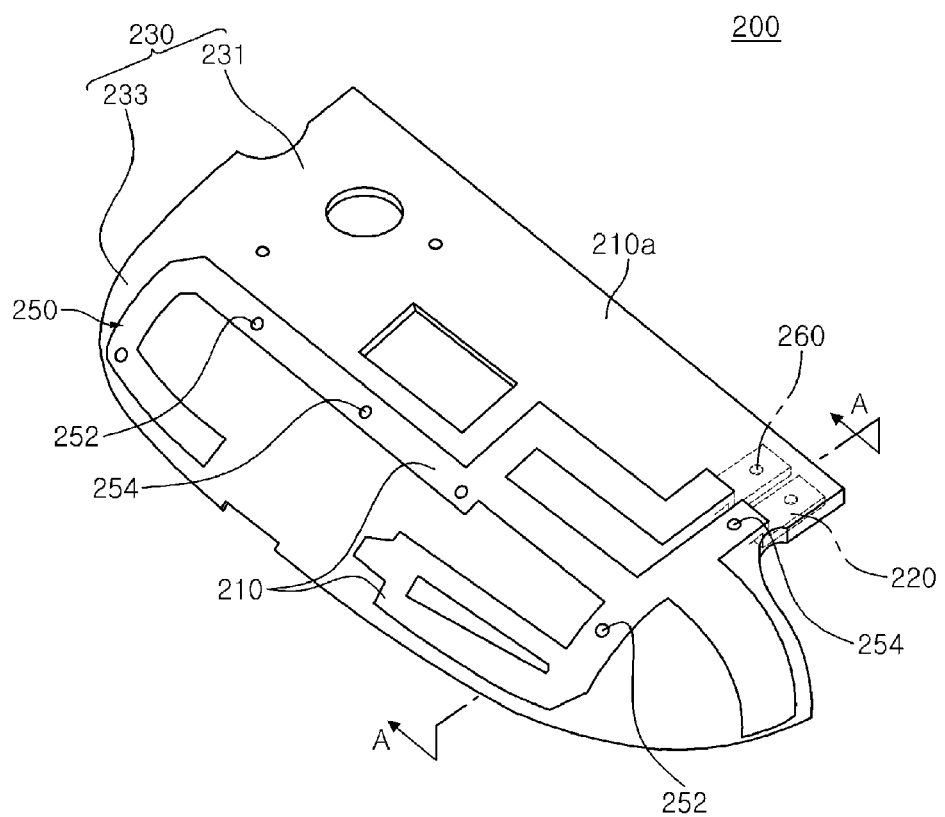
FIG. 3 is a schematic perspective view illustrating an antenna pattern frame according to an exemplary embodiment of the present invention.
Figure 4:
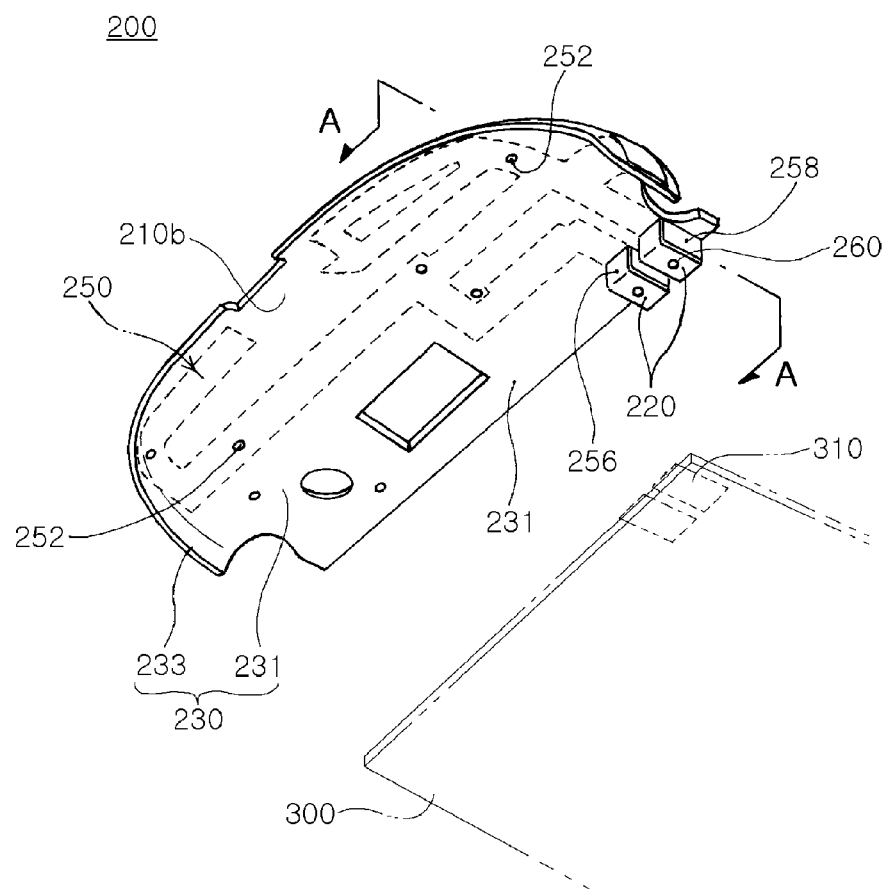
FIG. 4 is a rear perspective view illustrating the antenna pattern frame depicted in FIG. 3.

FIG. 1 is a schematic perspective view, with a cut-away portion, of a case of a mobile communications terminal, which is an electronic device, according to an exemplary embodiment. FIG. 2 is a schematic perspective view illustrating a radiator used in manufacturing an antenna pattern frame according to an exemplary embodiment. FIG. 3 is a schematic perspective view illustrating an antenna pattern frame according to an exemplary embodiment. FIG. 4 is a rear perspective view illustrating the antenna pattern frame depicted in FIG. 3.

Referring to FIGS. 1 through 4, a radiator 250, provided with an antenna pattern according to an exemplary embodiment of the present invention, is embedded in the case 110 of a mobile communications terminal 100. In order that the radiator 250 having the antenna pattern be embedded in the case 110, an antenna pattern frame 200 needs to be provided such that the radiator 220 having the antenna pattern is formed on a radiator frame 210.

The antenna pattern frame 200, according to an exemplary embodiment, may include the radiator 250 having an antenna pattern portion 210, a connection terminal portion 220, and the radiator frame 230.

The radiator 250, formed of a conductive material such as aluminum or copper, may receive an external signal and send the received external signal to a signal processor of an electronic device such as a mobile communications terminal 100. Further, the radiator 250 may have the antenna pattern portion 210, which is a meander line antenna pattern, in order to receive external signals with various bands.

As for the radiator 250, the antenna pattern portion 210 receiving external signals, and the connection terminal portion 220 contacting a circuit board of an electronic device to transmit the external signal to the electronic device may be disposed in different planes.

Moreover, the radiator 250 may have a three-dimensional structure by being bent such that the antenna pattern portion 210 and the connection terminal portion 220 are disposed in different planes. Here, the antenna pattern portion 210 and the connection terminal portion 220 may be connected by a connection portion 256.

The connection portion 256 may allow the antenna pattern portion 210 and the connection terminal portion 220 to be placed in different planes, that is, on one side 210a of the radiator frame 230 and on the other side 210b thereof, respectively. The connection terminal portion 220, which is not embedded in the case 110 of an electronic device, may be exposed to the other side 210b of the antenna pattern frame 200.

That is, the radiator 250 may be bent to provide the antenna pattern portion 210, the connection terminal portion 220, and the connection portion 256 connected therebetween. Thus, the radiator 250 has a three-dimensional curved shape.

In order to support the radiator 250 having a three-dimensional curved shape, a radiator support portion 258 may protrude from the other side 210b of the radiator frame 230.

The radiator support portion 258 may firmly support the connection portion 256 and the connection terminal portion 220 exposed to the other side 210b.

Here, the radiator support portion 258 may be formed by providing a resin material to the connection portion 256 and one side of the connection terminal portion 220 in a molding process using a mold 400 (See FIG. 6) to be described later.

Here, the radiator support portion 258 has a support hole 260 formed therein. A support boss 550 formed in a mold 500 (see FIG. 9B) is inserted into this support hole 260 at the time of injection molding for forming an electronic device case 110, in which the radiator frame 230 is embedded, within the internal space 540 of the mold 500. In such a manner, the radiator frame 230 is fixed and supported in the internal space of the mold 500.

The antenna pattern frame 200 may be fitted into the internal space 540 by the use of the support boss 550 formed in the mold 500, so that the degradation of transmission or reception at the connection terminal portion 220 is prevented.

Further, the radiator support portion 258 may include a hydraulic recess 270 having the same function as the support hole 260. A resin material flows into the hydraulic recess 270 at the time of injection molding for forming an electronic device case 110, in which the radiator frame 230 is embedded, within the internal space 540 of a mold 500 (see FIG. 10B). Thus, the radiator frame 230 is fixed and supported in the internal space of the mold 500.

The antenna pattern frame 200 may be fitted into the internal space 540 by the resin material filling the hydraulic recess 270, so that the degradation of transmission or reception at the connection terminal portion 220 is prevented.

Both a guide pin hole 252 and contact pin holes 254 may be formed in the radiator 250, and these holes will be described later.

The connection terminal portion 220 transmits a received external signal to an electronic device, and may be formed by bending, forming or drawing a part of the radiator 250.

Moreover, the connection terminal portion 220 may be manufactured separately from the radiator 250, and then connected to the radiator 250. The connection terminal portion 220 may be connected to a terminal 310 of a circuit board 300.

The radiator frame 230 may have a three-dimensional structure consisting of a straight portion 231 having a flat profile and a curved portion 233 with a curvature. The radiator 250 may have flexibility such that the radiator 250 can be disposed along the curved portion 233 of the radiator frame 230.

The radiator frame 230 is produced by injection-molding. While the antenna pattern portion 210 may be formed on one side 210a of the radiator frame 230, the connection terminal portion 220 may be formed on the other side 210b opposite to the one side 210a.

The one side 210a of the radiator frame 230, on which the antenna pattern portion 210 is formed, is bonded to the inside of the electronic device case 120, so that the antenna pattern can be embedded in the electronic device case 110.

As for the structure of the radiator 250 embedded in the electronic device case 110, the antenna pattern portion 210 receiving external signals and the connection terminal portion 220 transmitting the received external signals to the electronic device may be arranged in different planes.

Figure 5A:
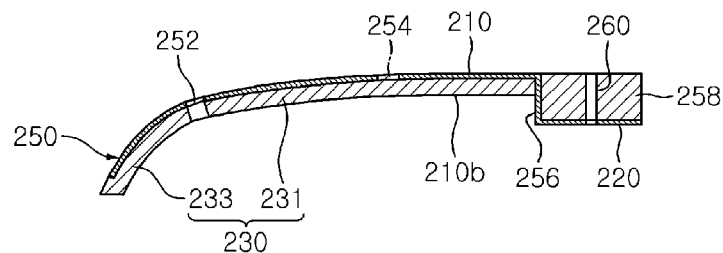
FIG. 5A is a schematic cross-sectional view taken along line A-A of FIGS. 3 and 4.
Figure 5B:
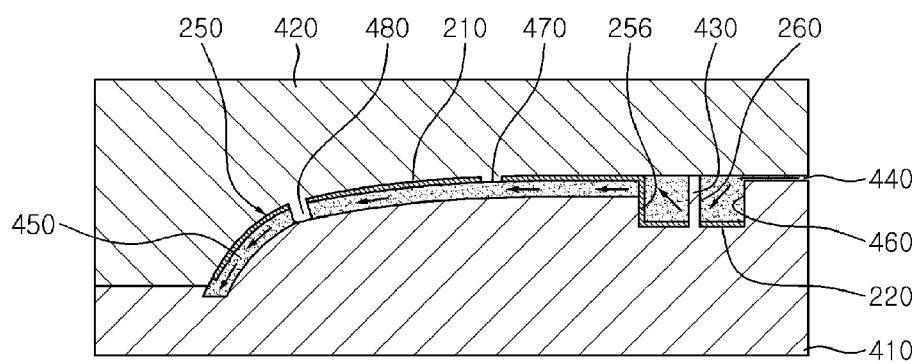
FIG. 5B is a schematic cross-sectional view illustrating how a mold for manufacturing an antenna pattern frame is filled with a resin material in order to manufacture an antenna pattern frame depicted in FIG. 5A.

FIG. 5A is a schematic cross-sectional view taken along line A-A in FIGS. 3 and 4. FIG. 5B is a schematic cross-sectional view illustrating how a mold for manufacturing an antenna pattern frame is filled with a resin material in order to manufacture the antenna pattern frame depicted in FIG. 5A.

Referring to FIG. 5A, a guide pin hole 252 or contact pin holes 254 may be formed in the radiator 250 of the antenna pattern frame 200 according to an exemplary embodiment.

The radiator 250 may have the guide pin hole 252 in which the guide pin 480 of a mold 400 is placed so as to prevent the radiator 250 from moving on the radiator frame 230.

The radiator 250 may also have the contact pin hole 254 in which a contact pin 470 of the mold 400 is placed so as to prevent the radiator 250 from moving on the radiator frame 230.

The contact pin 470 and the guide pin 480 may be formed on the radiator 250. After molding, the radiator frame 230 under the contact pin 470 is full, while there is a hole in the radiator frame 230 under the guide pin 480.

The contact pin 470, inserted into the contact pin hole 254 formed in the radiator 250, serves to prevent the radiator 250 from moving horizontally within the mold 400 for manufacturing the antenna pattern frame 200.

The guide pin 480, inserted into the guide pin hole 252 formed in the radiator 250, serves to prevent the radiator 250 from moving vertically within the mold 400 for manufacturing the antenna pattern frame 200.

Referring to FIG. 5B, the radiator 250, after provided, is disposed in the internal space 450 of the mold 400.

The internal space 450 is created when an upper mold 420 and a lower mold 410 are joined. Recesses formed in the upper mold 420 or the lower mold 410 become the internal space 450 as the upper and lower molds 420 and 410 are joined.

When the upper mold 420 and the lower mold 410 are joined, the guide pin 480, the contact pin 470, or the guide pin 480 and the contact pin 470 formed on the upper or lower mold 410 and 420 are placed in or contact the guide pin hole 252, the contact pin hole 254 or the guide pin hole 252 and the contact pin hole 254 formed in the antenna pattern portion 210, so that the radiator 250 can be fitted into the internal space 450.

The internal space 450 is filled with a resin material so as to form the radiator frame 230 allowing the antenna pattern portion 210 to be embedded in the electronic device case 110.

A resin material injection portion 440 may be formed in the upper mold 410, the lower mold 420 or the upper and lower molds 410 and 420. The resin material injection portion 440 allows a resin material to be introduced into the internal space 450 created when the upper and lower molds 410 and 420 are joined. In such a way, the radiator frame 230, allowing the antenna pattern portion 210 to be embedded in the electronic device case 110, is formed in the internal space 450.

The resin material is provided such that the radiator 250 is on the same level as the radiator frame 230. This improves the flow of a resin material when injection molding for manufacturing the electronic device case 110 is performed after placing the radiator frame 230 into a mold for manufacturing the electronic device case 110 in which an antenna pattern is embedded.

In this case, the internal space 450 of the upper or lower mold 410 or 420 may have a curved portion, so that the radiator frame 230 has a curved portion.

The internal space 450 of the upper and lower molds 410 and 420 receives the connection terminal portion 220, and may have a radiator support portion forming recess 460 allowing for the formation of the radiator support portion 258 supporting the connection terminal portion 220.

The radiator support portion forming recess 460 is filled with the resin material introduced through the resin material injection hole 440, thereby forming the radiator support portion 258 in the antenna pattern frame 220.

Further, the upper mold 410, the lower mold 420 or the upper and lower molds 410 and 420 may include a compression pin 430 on the upper mold 410, the lower mold 420 or the upper and lower molds 410 and 420. The compression pin 430 compresses the connection terminal portion 220 so that the connection terminal portion 220 contacts the support portion forming recess 460.

The compression pin 430 may prevent the resin material from flowing under the connection terminal portion 220. If a part of the connection terminal portion 220 is covered with an injection-molded object, an electrical connection may become unstable. The compression pin 430 may serve to prevent this unstable electrical connection.

In addition, the compression pin 430 allows for the formation of the support hole 260 in the antenna pattern frame 200 since the resin material is blocked in the portion where the compression pin 430 is formed.

When injection molding is performed on the electronic device case 110 in which the radiator frame 230 is embedded, a support boss 550 (see FIGS. 9A and 9B), formed in the mold 500 (see FIG. 9B), is inserted into the support hole 260, formed by the compression pin 430. Thus, the support hole 260, formed by the compression pin 430, serves to fix and support the radiator frame 230 in the inner space of the mold 500 (see FIG. 9B).

Figure 6A:
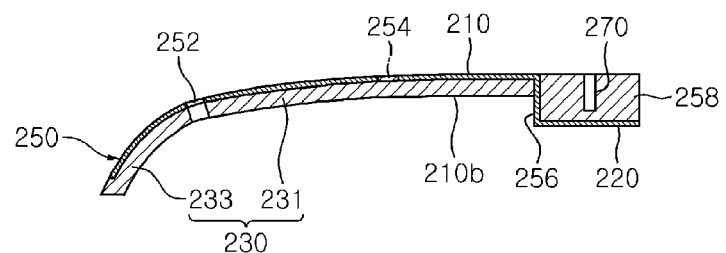
FIG. 6A is a schematic cross-sectional view illustrating an antenna pattern frame according to another exemplary embodiment of the present invention.
Figure 6B:
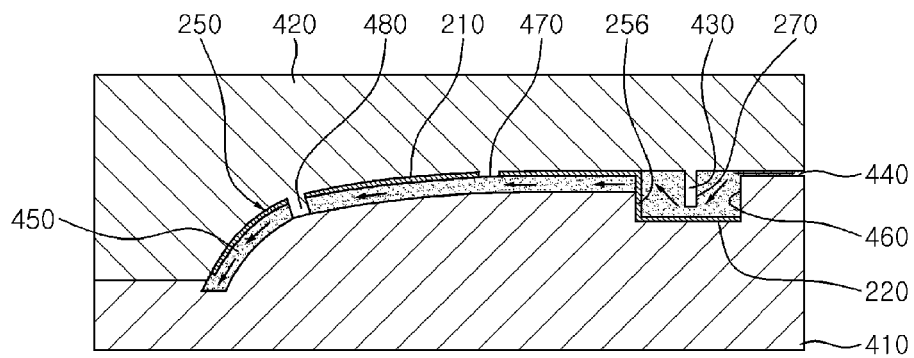
FIG. 6B is a schematic cross-sectional view illustrating how a mold for manufacturing an antenna pattern frame is filled with a resin material in order to manufacture the antenna pattern frame depicted in FIG. 6A.

FIG. 6A is a schematic cross-sectional view illustrating an antenna pattern frame according to another exemplary embodiment. FIG. 6B is a schematic cross-sectional view illustrating how a resin material flows into a mold for manufacturing an antenna pattern frame.

Referring to FIGS. 6A and 6B, the antenna pattern frame 200 may include a hydraulic recess 270. The hydraulic recess 270 may be formed by a hydraulic recess forming pin 490 formed on the upper mold 410, the lower mold 420 or the upper and lower molds 410 and 420.

The length of the hydraulic recess forming pin 490 does not need to be fixed, and may be set to be long enough to fix and support the radiator frame 230 within the internal space of a mold for injection molding the electronic device case 110 in which the radiator frame 230 is embedded.

Figure 7:
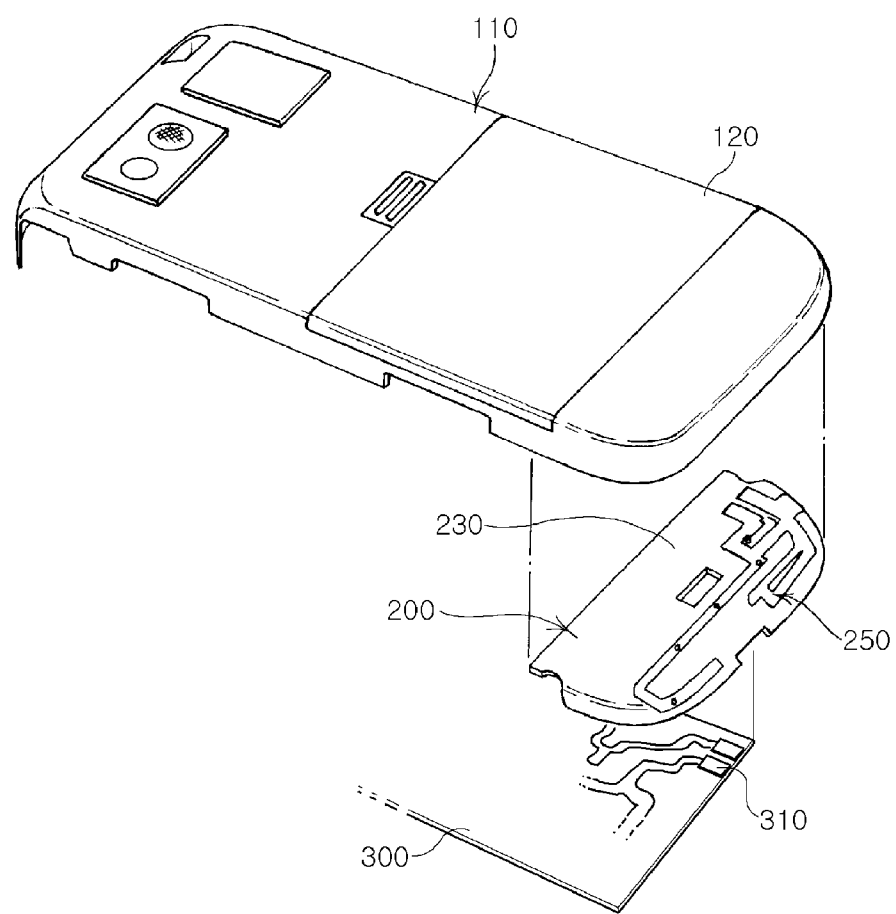
FIG. 7 is an exploded perspective view illustrating a case of a mobile communications terminal, an electronic device in which the antenna pattern radiator according to an exemplary embodiment of the present invention is embedded.

FIG. 7 is an exploded perspective view illustrating a case of a mobile communications terminal, which is an electronic device in which an antenna pattern radiator according to an exemplary embodiment is embedded.

Referring to FIG. 7, a case 110 of an electronic device (hereinafter also "electronic device case"), in which the antenna pattern radiator 200 according to an exemplary embodiment is embedded, may include the radiator 250, the radiator frame 230, and the case frame 120.

A description of the radiator 250 and the radiator frame 230, described in the above embodiment, will be omitted.

The case frame 120 covers one side of the radiator frame 230 on which the antenna pattern portion 210 is disposed, thereby embedding the antenna pattern potion 210 between the case frame 120 and the radiator frame 230.

Further, the radiator frame 230 and the case frame 120 may be integrated without having boundaries therebetween. When the electronic device case 110 is viewed from the rear side, only the connection terminal portion 220 is exposed, while the antenna pattern portion 210 is unseen.

The radiator frame 230, the case frame 120, or the radiator frame 230 and the case frame 120 may be formed by injection molding. In particular, if the radiator frame 230 and the case frame 120 are provided as separate injection-molded units, the radiator frame 230 including the radiator 250 is bonded to the case frame 120.

The case frame 120 is injection-molded so as to be integrated with the radiator frame 230. That is, double injection molding may be performed. In detail, the radiator frame is put into the mold 500 and insert-injection is performed, such that the radiator frame 230 and the case frame 120 are integrated.

When the radiator frame 230 is put into the mold 500 (see FIGS. 10A and 10B) for manufacturing an electronic device case, the guide pin hole 252 or the contact pin hole 254 formed in the radiator frame 230 may be coupled with a guide pin or a contact pin formed in the mold 500, thereby preventing the antenna pattern frame 200 from moving within the mold 500.

Figure 8:
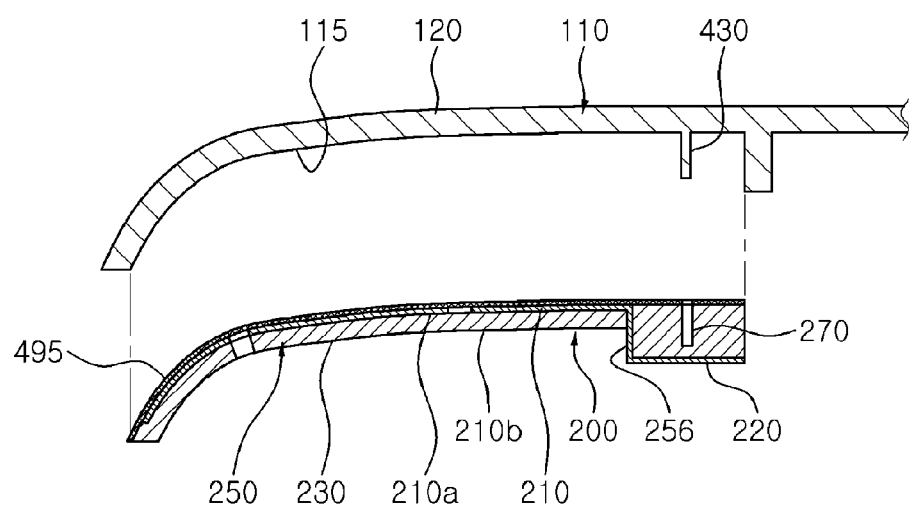
FIG. 8 is a schematic view illustrating a method of manufacturing the case of an electronic device in which the antenna pattern radiator according to an exemplary embodiment of the present invention is embedded.

FIG. 8 is a schematic view illustrating a method of manufacturing an electronic device case in which an antenna pattern radiator is embedded.

Referring to FIG. 8, the case frame 120 is a separate injection-molded part having a radiator receiving space 115 corresponding to the radiator frame 230. An electronic device case 110 in which an antenna pattern radiator is embedded may be manufactured by bonding the radiator frame 230 to the radiator receiving space 115.

An adhesive layer 495 may be formed on the surface of the radiator 250 of the antenna pattern frame 200.

In addition, the case frame 120 may have a projection 430, formed by a resin material introduced when the radiator frame 230 is embedded in the electronic device case 110 being injection-molded.

FIGS. 9A and 9B and FIGS. 10A and 10B are schematic cross-sectional views illustrating how an antenna pattern radiator is inserted into a mold for manufacturing an electronic device and how a resin material is provided in order to manufacture an electronic device case according to exemplary embodiments.

Figure 9A:
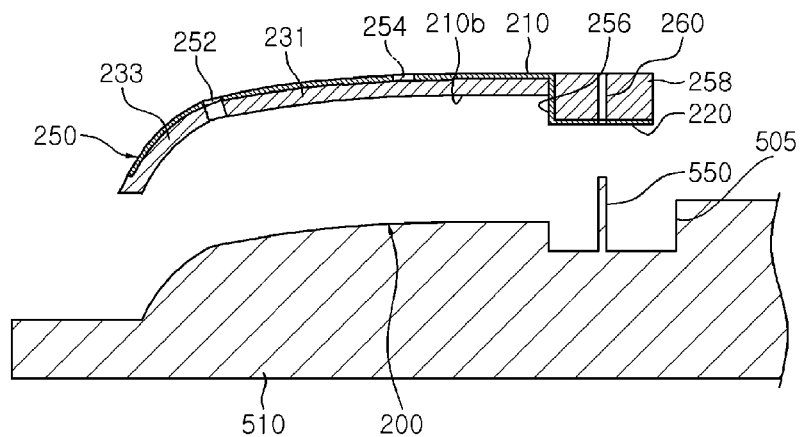
FIG. 9A is a schematic cross-sectional view illustrating how an antenna pattern radiator is inserted into a mold for manufacturing an electronic device according to an exemplary embodiment of the present invention.
Figure 9B:
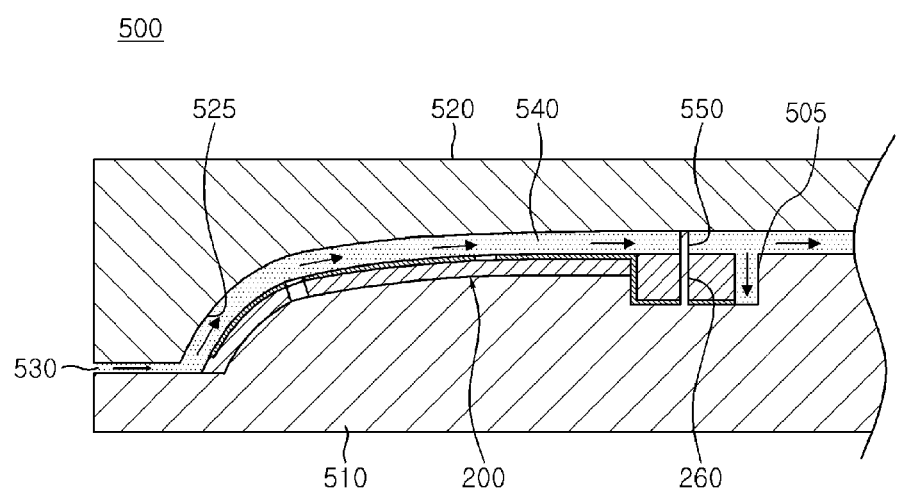
FIG. 9B is a schematic cross-sectional view illustrating how a resin material is provided to the mold depicted in FIG. 9A.

Referring to FIGS. 9A and 9B, the antenna pattern frame 200 may be supported and fixed, by its support hole 260, in the internal space 540 of the mold 500 for manufacturing an electronic device case according to an exemplary embodiment.

The support boss 260 of the lower mold 510, inserted into the support hole 250, supports and fixes the antenna pattern frame 200, thereby preventing defects caused by the protrusion of the exterior, standing against injection pressure during the injection molding, and preventing the degradation in transmission and reception at the antenna pattern portion.

The support boss 260 may extend to the same length as the thickness of the electronic device case 110 formed by the introduction of a resin material. The support boss 260 inserted into the support hole 260 may help to achieve desirable flow effects.

The support boss 260 is illustrated in FIG. 9 as being formed on the lower mold 510. However, the invention is not limited to this illustration, and the support boss 260 may be formed on the upper mold 520.

The radiator frame 230 is placed in the mold 500 for manufacturing an electronic device case, which has the internal space therein, and a resin material is introduced thereinto, thereby integrating the radiator frame 230 with the electronic device case 110.

The radiator frame 230 and the case frame 120 may be formed without having a boundary therebetween.

The internal space 540 of the mold 500 may include a curve forming portion 525 shaping the electronic device case 110 to have a curved portion.

Here, the lower mold 510 may have an insertion recess 505 in which the radiator support portion 258 of the antenna pattern frame 200 is inserted.

The protruding radiator support portion 258 is received in the insertion recess 505. The insertion recess 505 may be greater than the radiator support portion 258 in order to fix the antenna pattern frame 200.

The radiator support portion 258 is inserted into the insertion recess 505, and a resin material is inserted into the remaining space therein. In such a manner, the antenna pattern frame 200 is integrated with the electronic device case.

A resin material injection portion 530 may be formed in the upper mold 510, the lower mold 520 or the upper and lower molds 510 and 520. The resin material injection portion 530 allows a resin material to be introduced into the internal space 540 created when the upper and lower molds 510 and 520 are joined. In such a way, the electronic device case 120 is formed in the internal space 540.

Like the radiator 250, the radiator frame 230 also includes a guide pin hole or a contact pin hole. The guide pin hole or the contact pin hole may be fixed to the guide pin or the contact pin formed in the mold 500, so that the radiator frame 230 is prevented from moving within the mold 500.

Figure 10A:
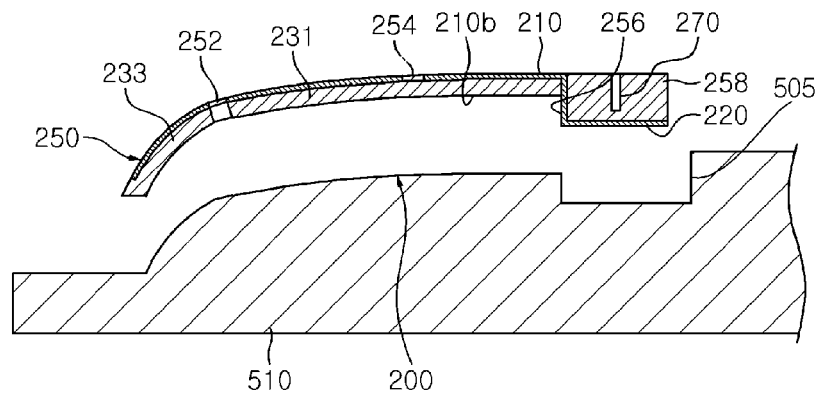
FIG. 10A is a schematic cross-sectional view illustrating how an antenna pattern radiator is inserted into a mold for manufacturing an electronic device according to another exemplary embodiment of the present invention.
Figure 10B:
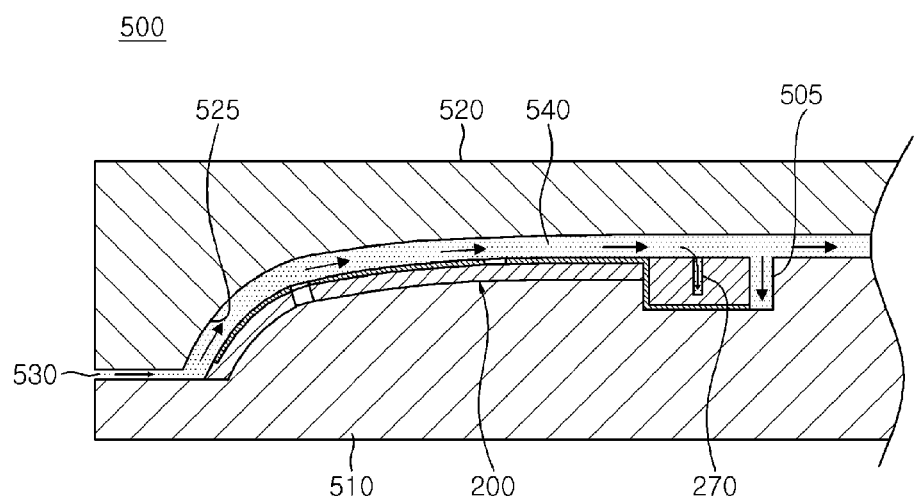
FIG. 10B is a schematic cross-sectional view illustrating how a resin material is provided to the mold depicted in FIG. 10A.

Referring to FIGS. 10A and 10B, the antenna pattern frame 200 within the mold 500 for manufacturing an electronic device case, according to another exemplary embodiment, may be supported and fixed in the internal space 540 by the hydraulic recess 270.

The resin material introduced into the hydraulic recess 270 supports and fixes the antenna pattern frame 200, thereby preventing defects caused by the protrusion of the exterior, standing against injection pressure during the injection molding and preventing the degradation in transmission and reception at the antenna pattern portion.

As the resin material flows into the hydraulic recess 270, the antenna pattern frame 200 may be supported and fixed in the internal space 540 of the mold 500.

As described in the above exemplary embodiments, the antenna pattern frame 200 within the mold 500 for manufacturing the electronic device case may be supported and fixed in the internal space 540 of the mold 500 by the support hole 260 or the hydraulic recess 270, thereby preventing defects caused by the protrusion of the exterior, standing against injection pressure during the injection molding and preventing the degradation in transmission and reception at the antenna pattern portion.

As set forth above, according to exemplary embodiments of the invention, an antenna pattern frame and a mold for manufacturing an electronic device case including the same can prevent defects caused by the protrusion of the exterior, stand against injection pressure during the injection molding and prevent the degradation in transmission and reception at the antenna pattern portion, when an electronic device case in which an antenna radiator is embedded is injection-molded.

While the present invention has been shown and described in connection with the exemplary embodiments, it will be apparent to those skilled in the art that modifications and variations can be made without departing from the spirit and scope of the invention as defined by the appended claims.

What is claimed is:

1. An antenna pattern frame, comprising:
   a radiator comprising an antenna pattern portion for transmitting and receiving a signal and a connection terminal portion for transmitting a signal to and receiving a signal from a circuit board of an electronic device; and
   a radiator frame having the antenna pattern portion disposed on one surface thereof and including a radiator support portion protruding from another surface thereof, opposite to the one surface,
   wherein the connection terminal portion protrudes from the another surface of the radiator frame and contacts the radiator support portion, and
   wherein the radiator frame includes a hydraulic recess, and the hydraulic recess is depressed towards the connection terminal portion from the one surface of the radiator frame.

2. The antenna pattern frame of claim 1, wherein the radiator comprises a connection portion forming a part of the radiator and connecting the connection terminal portion with the antenna pattern portion so that the antenna pattern portion is disposed on the one surface of the radiator frame and the connection terminal portion is supported by the radiator support portion.

3. The antenna pattern frame of claim 1, wherein the hydraulic recess is formed in the radiator support portion and spaced apart from one surface of the radiator support portion, which is in contact with the connection terminal portion.

4. An antenna pattern frame, comprising:
   a radiator comprising an antenna pattern portion for transmitting and receiving a signal and a connection terminal portion for transmitting to and receiving from a circuit board of an electronic device; and
   a radiator frame having the antenna pattern portion disposed on one surface thereof and including a radiator support portion protruding from another surface thereof, opposite to the one surface,
   wherein the connection terminal portion protrudes from the another surface of the radiator frame and contacts the radiator support portion, and
   wherein the radiator frame includes a support hole, and the support hole sequentially penetrates the connection terminal portion and the radiator frame.

5. The antenna pattern frame of claim 4, wherein the radiator comprises a connection portion forming a part of the radiator, and connecting the connection terminal portion with the antenna pattern portion so that the antenna pattern portion is disposed on the one surface of the radiator frame and the connection terminal portion is supported by the radiator support portion.

6. The antenna pattern frame of claim 4, wherein the support hole penetrates the radiator support portion.

* * * * *